United States Patent [19]
Gotou et al.

[11] Patent Number: 5,371,604
[45] Date of Patent: Dec. 6, 1994

[54] APPARATUS FOR EDIT RECORDING OF A COMPRESSED DIGITAL VIDEO SIGNAL ON A RECORDING TAPE

[75] Inventors: Makoto Gotou, Nishinomiya; Yoshio Sakakibara, Neyagawa; Akihiko Nakamura; Kei Ichikawa, both of Osaka; Haruo Isaka, Yawata; Kenichi Honjo, Kobe, all of Japan

[73] Assignee: Matsushita Electric Industrial Co., Ltd., Osaka, Japan

[21] Appl. No.: 69,525

[22] Filed: Jun. 1, 1993

[30] Foreign Application Priority Data

Jun. 10, 1992 [JP] Japan ............................ 4-150334

[51] Int. Cl.⁵ .............................................. H04N 5/76
[52] U.S. Cl. ................................ 358/337; 358/338; 358/339; 358/325; 360/27
[58] Field of Search ............. 358/335, 337, 338, 339, 358/310, 320, 321, 323, 325, 327; 360/8, 9.1, 27, 33.1; H04N 5/76, 9/79

[56] References Cited

U.S. PATENT DOCUMENTS

| | | | |
|---|---|---|---|
| 4,638,375 | 1/1987 | Motoyama | 358/338 |
| 5,063,453 | 11/1991 | Yoshimura et al. | 360/8 |
| 5,081,550 | 1/1992 | Yagisawa et al. | 360/78.02 |
| 5,144,453 | 9/1992 | Suga et al. | 358/335 |

FOREIGN PATENT DOCUMENTS

| | | |
|---|---|---|
| 0316184 | 5/1989 | European Pat. Off. |
| 0361315 | 4/1990 | European Pat. Off. |
| 0393207 | 10/1990 | European Pat. Off. |
| 63-146674 | 6/1988 | Japan |

OTHER PUBLICATIONS

"An Experimental Digital VCR with 40 mm Drum, Single Actuator and DCT-Based Bit-Rate Reduction", Borgers et al., IEEE Transactions on Consumer Electronics, 1988, pp. 597-605.

"An Experimental Digital VCR With 40 MM Drum, Single Actuator And DCT-Based Bit-Rate Reduction," Borgers et al., 1988 IEEE, pp. 597-605.

Primary Examiner—Tommy P. Chin
Assistant Examiner—Khoi Truong
Attorney, Agent, or Firm—Wenderoth, Lind & Ponack

[57] ABSTRACT

In an apparatus for multi-segment recording/reproducing of a compressed digital video signal, a reproduced position within a group unit of the video signal is detected by a reproduced position detector in its reproducing state. A relative position detector detects and stores a phase difference of the reproduced position and a position indicated by a reference signal synchronized with the input video signal. A delay time adjuster adjusts a delay time of the compressed video signal according to this phase difference. A head is changed over from its reproducing state to its recording state by a switch so as to record the compressed video signal delayed by the delay time adjuster on a recording medium.

10 Claims, 5 Drawing Sheets

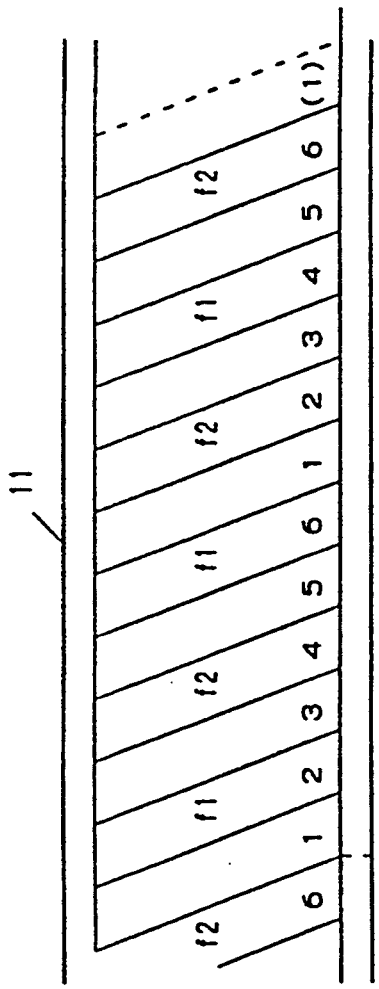
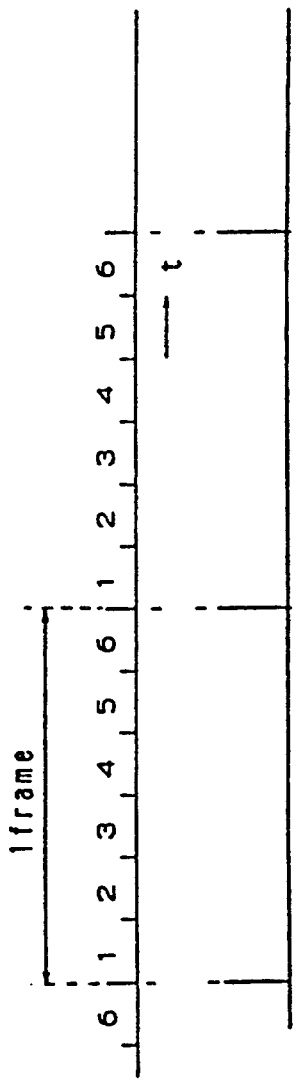
Fig. 4(a)
Fig. 4(b)
Fig. 4(c)
Fig. 4(d)

APPARATUS FOR EDIT RECORDING OF A COMPRESSED DIGITAL VIDEO SIGNAL ON A RECORDING TAPE

BACKGROUND OF THE INVENTION

1. Field of the Invention

The present invention relates to a digital signal recording and reproducing apparatus capable of recording and reproducing a digital information signal, such as a digital video signal having compressed data and reduced bandwidth.

2. Description of the Prior Art

A digital signal recording and reproducing apparatus, such as a digital video tape recorder (e.g. a digital VCR), for recording and reproducing digitized video signals has been developed for professional use because it has reduced in deterioration of recorded and reproduced video signals caused by dubbing as compared with an analog signal recording and reproducing apparatus. Digitized video data, however, large contain an amount in the quantity of information, and consume a very large amount of tape for recording. So, for consumer-use, attempts have been made to record the digital video signal after data compression and bandwidth reduction by predictive coding, DCT (discrete cosine transform) coding, and variable length coding. For example, the data in each frame of the video signal is compressed, divided and recorded on plural consecutive tracks of a tape (e.g. "An Experimental Digital VCR with 40 mm Drum, Single Actuator and DCT-Based Bit-Rate Reduction", S. M. C. Borgers et al., IEEE Transactions on Consumer Electronics, Vol. 34, No. 3, pp. 597–605, August 1988).

This method is explained below with reference to FIG. 1. A magnetic tape 11 having a specific tape width is wound on a cylinder 12, and is driven to run at a constant speed. In recording, an input video signal 211 is inputted to an A/D (analog-to-digital) converter 201 to be digitized into a digital video signal 212 having a specific bit width. A compressor 202 compresses the data of the digital video signal 212, and produces a compressed video signal 213. At this time, the compressor 202 divides a specified group unit (one frame) of the digital video signal 212 further into small blocks, and shuffles the small blocks. A modulator 203 modulates the compressed video signal 213 to be suited to magnetic recording, and produces a modulated video signal 214. The modulator 203 also combines the modulated video signal 214 with a pilot signal when necessary. A switch 204 is connected to the 204A side when recording to send the modulated video signal 214 to magnetic heads 13A and 13B and record the signal on a magnetic tape 11. By the shuffling conducted in the compressor 202, the video signal within each specified group unit (in each frame) is divided into six tracks.

When reproducing and magnetic heads 13A, 13B mounted on the cylinder 12 reproduce the modulated video signal 215 from the magnetic tape 11. The reproduced modulated video signal 215 is demodulated into a compressed video signal 216 by a demodulator 205, and then decompressed into a digital video signal 217 by a decompressor 206. A D/A (digital-to-analog) converter 207 converts the digital video signal 217 to an analog video signal 218.

In such digital recording and reproducing apparatus (for example, a digital VCR), when a new video signal is recorded on an already recorded magnetic tape, the linkage part of the recorded tracks and the shuffling group units partially become discontinuous. As a result, when reproducing a discontinuously recorded tape, noise is formed in the reproduced image at this discontinuous portion, and the quality of the reproduced image is impaired.

For example, as shown in FIG. 2, when a new signal is newly recorded in a pre-recorded region, the continuity of the tracks is interrupted at the starting position of the new recording. Further, when one frame which is the group unit of shuffling and compression is divided into six tracks to be recorded, the starting position of the new recording also spoils the continuity of this six-track unit. Therefore fore, when such a discontinuously recorded tape is reproduced, the tracking control is disturbed due to track discontinuity, or the decompression operation is disturbed due to discontinuity of the group unit, thereby producing noise temporarily on the reproduced screen.

To avoid such discontinuity, for example, a method of eliminating discontinuity by mechanical action is disclosed in U.S. patent application "Reproducing Apparatus", Yoshio Sakakibara et al., Ser. No. 08/041,124 (tentatively assigned), filed Mar. 31, 1993. According to this method, a magnetic tape is preparatory run in a reproduction in a pre-roll section before the start of recording, and the reproduced position of the magnetic tape 11 is changed by an amount corresponding to a specified number of tracks so that the phase of the frame of the reproduced signal coincides with the phase of the frame of the signal to be recorded. At the moment of reaching the recording start position, the actual recording is started. In such method, however, since it requires a mechanical action, it takes a very long time until the transfer action of the reproduced track position of the magnetic tape is finally stabilized.

SUMMARY OF THE INVENTION

It is hence a primary object of the invention to present a digital signal recording and reproducing apparatus capable of performing new signal recording on a pre-recorded recording medium while maintaining the continuity of track and continuity of compressed group unit.

To achieve the above object, the invention presents a digital signal recording and reproducing apparatus comprising: a compressing means for compressing the data amount of an input digital video signal; a head for recording the compressed pressed video signal on a recording medium and for reproducing the recorded signal; a switching means for changing over a head for recording and reproducing; a tracking control means for controlling tracking of the head on a track of the recording medium during reproducing; a reproduced position detecting means for detecting a reproduced track position in a group unit from a reproduced signal obtained from the head and for producing a track position signal corresponding to the reproduced track position; a relative phase detecting means for detecting a relative phase of the track position signal with respect to that of a reference signal synchronized with the input digital video signal, and a delay time adjusting means for delaying the compressed video signal for a delay time corresponding to plural tracks according to the relative phase detected by the relative phase detecting means; wherein the switching means is changed over from reproducing to recording after the delay time is set by the delay time adjusting means corresponding to the relative phase detected by the relative phase detecting means, thereby recording the compressed video signal delayed by the delay time adjusting means.

In the digital signal recording and reproducing apparatus of the invention having such a constitution, by transferring from a reproducing state to a recording state after setting the delay time in the delay time adjusting means in order to obtain a delayed compressed video signal delayed by the delay time corresponding to the relative phase of the reproduced position signal with respect to the reference signal synchronize with the input video signal while tracking in reproducing, the continuity of track and continuity of shuffling group unit are maintained. As a result, when a digital VCR is composed by the digital signal recording and reproducing apparatus of the present invention, reproduced images of high quality without noise due to discontinuity of recording can be always obtained.

BRIEF DESCRIPTION OF THE DRAWINGS

FIGS. 4 (a)–4 (d) are diagrams for explaining an operation of the present invention.

DESCRIPTION OF THE PREFERRED EMBODIMENT

Figure 1:
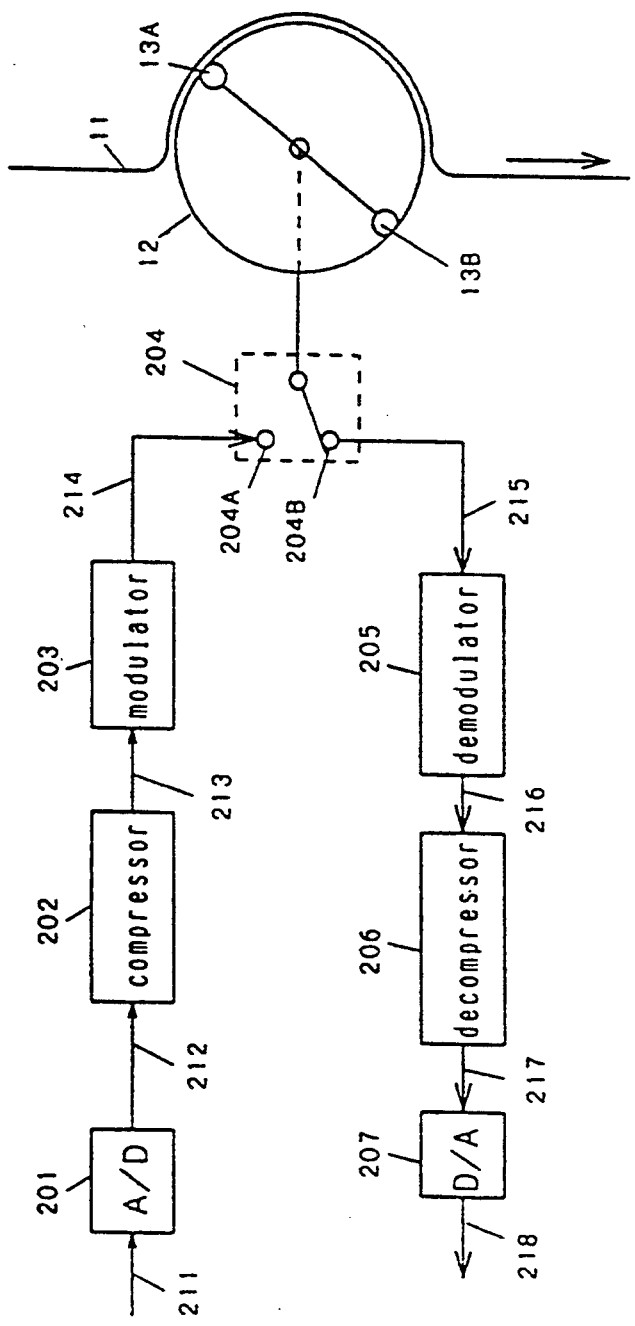
FIG. 1 is a block diagram showing a conventional digital signal recording and reproducing apparatus.
Figure 2:
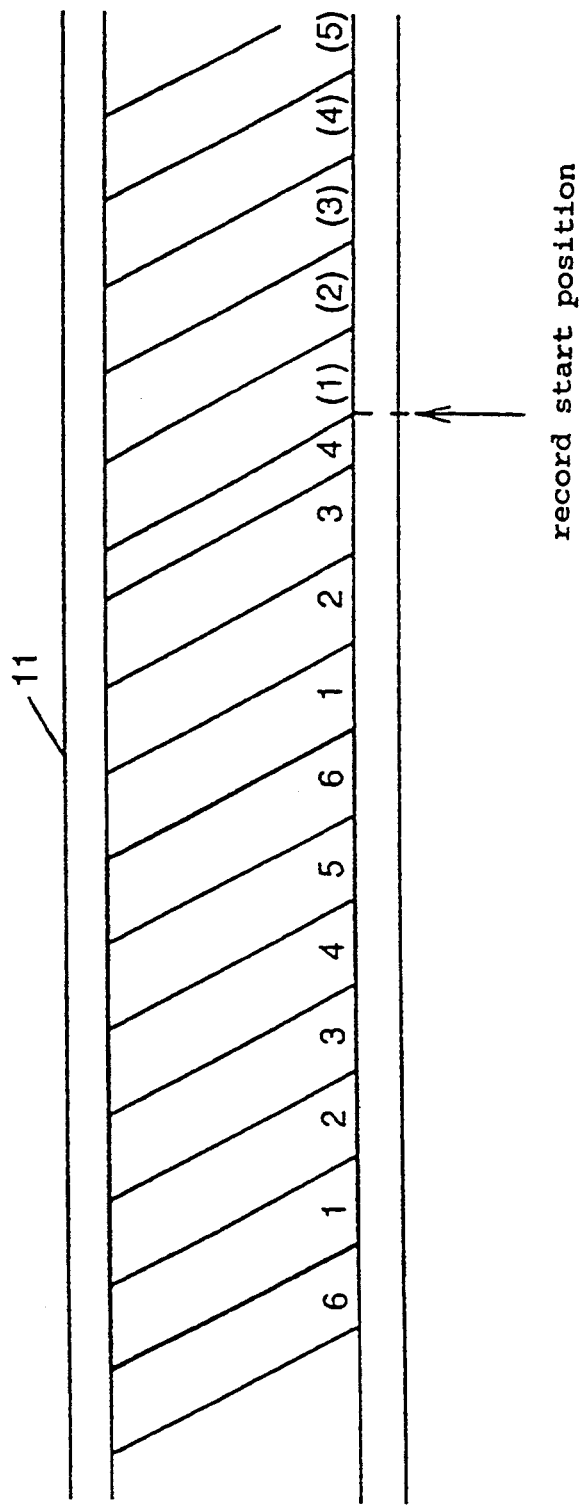
FIG. 2 is a diagram for explaining the operation of the prior art.
Figure 3:
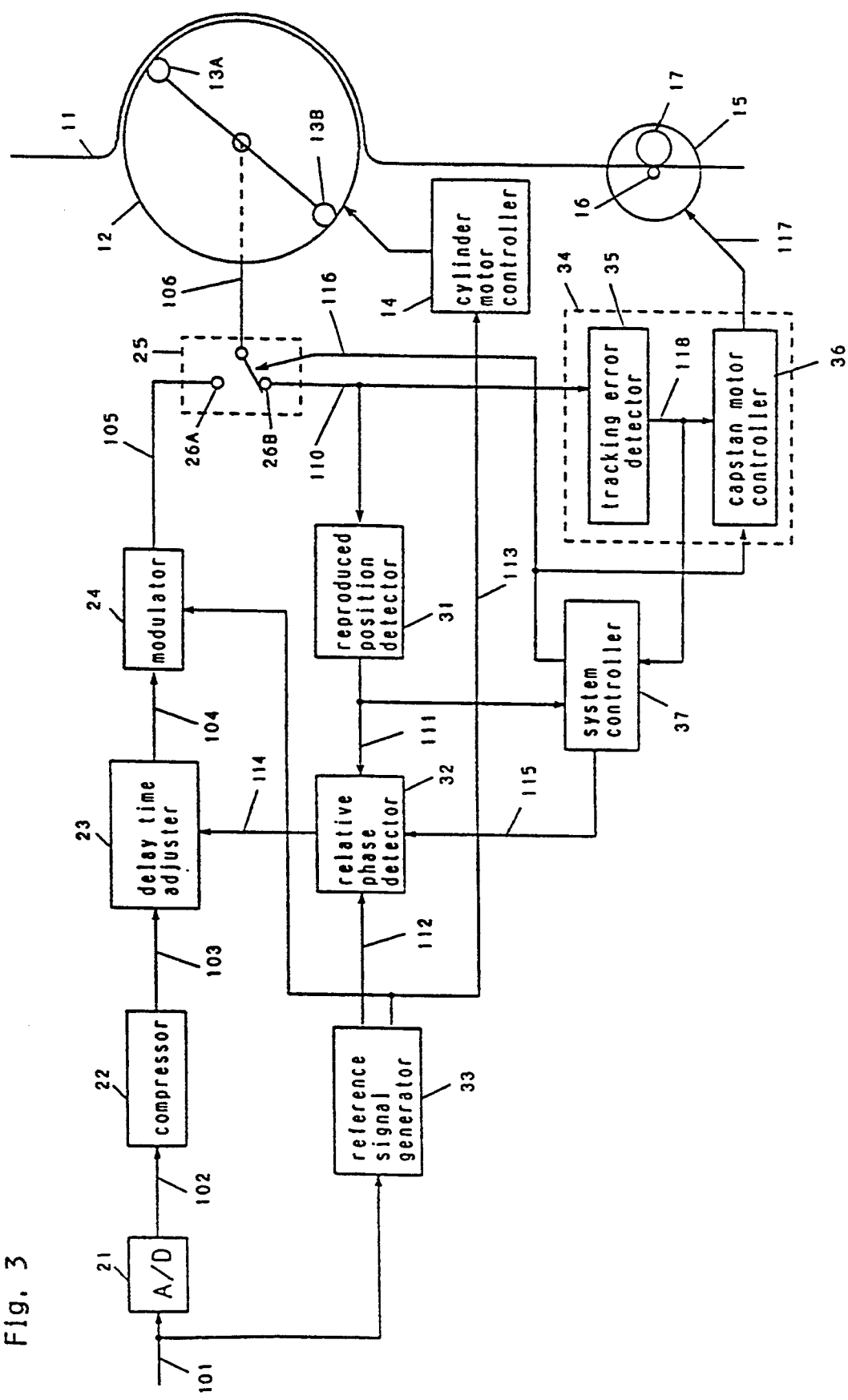
FIG. 3 is a block diagram showing an embodiment of the present invention.

A digital signal recording and reproducing apparatus in an embodiment of the invention is described below by referring to the accompanying drawings. FIG. 3 is a block diagram of a digital VCR embodying the present invention.

First of all, the operation in stationary state during recording is described. A system controller 37 produces a signal indicating the recording state as a changeover signal 116. A magnetic tape 11 is pinched between a capstan 16 and a pinch roller 17, and runs at a speed corresponding to a rotating speed of a capstan motor 15. A capstan motor controller 36 controls the capstan motor 15 to rotate at a specific constant speed according to the changeover signal 116. The magnetic tape 11 runs at a specific constant speed. Magnetic heads 13A and 13B have mutually different azimuth angles, and are mounted on a rotary cylinder 12 at 180-degree confronting positions. The tape 11 is wound around the cylinder 12 over substantially 180 degrees. A reference signal generator 33 generates a frame reference signal 112 synchronized with the frame of an input video signal 101, and a cylinder reference signal 113 having a triple frequency of the frequency of the frame reference signal 112. The cylinder 12 is controlled by a cylinder motor controller 14 to rotate in synchronism with the cylinder reference signal 113.

The input video signal 101 is digitized into a digital signal of a specific bit width (for example, 8 bits) by an A/D converter 21. The digital video signal 102 is fed into a compressor 22, in which the data in each group unit (each frame) are divided into small blocks, reordered by shuffling, and data compressed by DCT conversion, variable length coding, etc. The amount of information is compressed to about 1/5 to 1/10 of its original amount, and thus a compressed video signal 103 is produced. A delay time adjuster 23 delays the compressed video signal 103 by a delay time corresponding to the relative phase signal 114 from a relative phase detector 32, to produce a delayed video signal 104. The delayed video signal 104 is subjected to channel coding (for example, interleaved NRZI modulation, 8-to-14 modulation, or 8-to-10 modulation) suited to magnetic recording by a modulator 24. The modulator 24 cuts and divides the delayed video signal 104 in every half period of the cylinder reference signal 113. As a result, the compressed video signal of one frame is divided into six sections. Each divided section corresponds to one track on the tape 11. Furthermore, the modulator 24 adds to each section the information (track position information) showing the sequential order of the section in the frame. Moreover, by digital bit modulation or analog signal addition, pilot signals of a first frequency f1 and a second frequency f2 are alternately mixed in every two sections. The thus processed signal is produced as a modulated video signal 105. The switch circuit of a switch 25 is connected to the 26A side by the changeover signal 116, so that the modulated video signal 105 is fed to the magnetic heads 13A and 13B, and recorded on the magnetic tape 11.

FIG. 4 (a) shows the track pattern recorded on the magnetic tape 11. The modulated video signal 105 of one frame is divided into six consecutive tracks and recorded. In each track, information signals including the sequential track number (one of 1 to 6) are also recorded by time sharing with the modulated video signal, so that the track position information in the frame can be detected. In addition, pilot signals of the first frequency f1 and the second frequency f2 are sequentially recorded in every two tracks with a track without a pilot signal placed therebetween. Meanwhile, in order to divide and record the modulated video signal 105 of one frame into six tracks, the cylinder 12 rotates, when recording, in synchronism with the cylinder reference signal 113 at triple the frequency of that of the frame synchronizing signal of the input video signal 101. The tracks without pilot signal are recorded by the magnetic head 13A, and the tracks containing pilot components are recorded by the magnetic head 13B. The modulator 24 produces the modulated video signal 105 corresponding to every track by matching with the timing of the cylinder reference signal 113.

Figure 5:
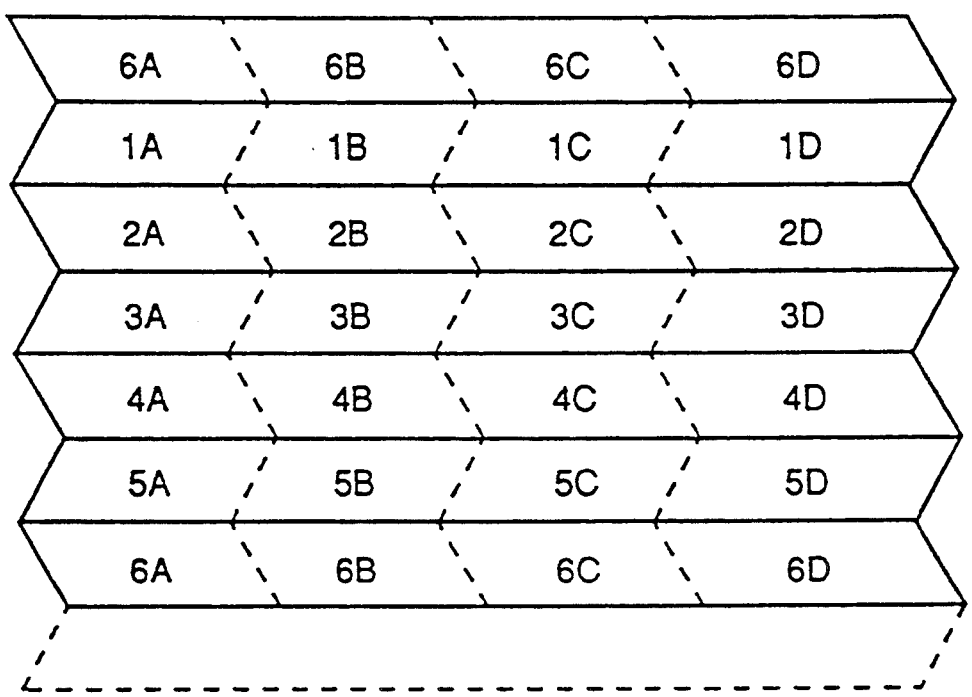
FIG. 5 Is a track pattern diagram for explaining an operation of the invention.

A more specific track pattern is shown in FIG. 5. The recording azimuth of track differs alternately in every track corresponding to the azimuth of a corresponding one of the magnetic heads 13A and 13B, and tracks are recorded without a guard band. The modulated video signal is divided into blocks also within each track, and recorded in divisions. In the diagram, numerals 1 to 6 indicate the track numbers, and symbols A to D refer to the divisions of small blocks. When reproducing, demodulation and decompression are performed every time one divided block in the track is reproduced and a combined reproduced video signal can be formed by placing each block into the area of the screen to be occupied by the block (reverse action of shuffling).

Explained next is the operation for recording a new video signal successively to an already recorded region. In the first place, the system controller 37 connects the switch 25 to the 26B side by the changeover signal 116 to set the heads 13A and 13B in their reproducing state. The cylinder controller 14 controls the cylinder 12 to rotate in synchronism with the cylinder reference signal 113 from the reference signal generator 33. The cylinder reference signal 113 is a timing signal having three times the frequency of that of the frame reference signal 112. The magnetic heads 13A and 13B reproduce the modulated video signal recorded in the magnetic tape 11 to obtain a head reproduced signal 106. Since the switch 25 is connected to the 26B side, the head output is transmitted as a modulated reproduced signal 110.

The tracking controller 34 is composed of a tracking error detector 35 and a capstan motor controller 36. The tracking error detector 35 extracts a pilot signal contained in the modulated reproduced signal 110, compares the magnitude of the frequency f1 component and the frequency f2 component with each other, and produces the result of comparison as a tracking error signal 118. The capstan controller 36 controls the rotation of the capstan motor 15 so that the f1 component and the f2 component of the pilot signal are balanced in response to the tracking error signal 118 in the reproducing state. In the tracking error detector 35, the pilot signal components are compared for every two tracks. It is designed to compare the magnitude between the pilot signal f1 component and f2 component leaking and mixing from adjacent tracks into the magnetic head 13A reproducing the track in which the pilot signal is not recorded. When reproducing every two tracks, the polarity of the comparison of the pilot signal components is inverted, and the magnitude of the pilot component of the preceding track is always compared with the magnitude of the pilot component of the succeeding track. The capstan motor controller 36 controls the rotating speed of the capstan motor 15 according to the tracking error signal 118 obtained in this way. Thus, the magnetic heads 13A and 13B accurately track and reproduce the tracks matched in azimuth. The interval (control period) of lock position of the tracking control is four tracks equal to one cycle of a set of pilot signals recorded on the tape.

A reproduced position detector 31 detects the reproduce track position in FIG. 4 (b) from the modulated reproduced signal 110, and produces a track position signal 111 as shown in FIG. 4 (c). The track position signal 111 is a timing signal expressing the generation timing of track number 1 (or the track position number in one frame unit may be also used).

The relative phase detector 32 detects the relative phase of the track position signal 111 from the reproduced position detector 31 with respect to that of the frame reference signal 12 (FIG. 4 (d)) from the reference signal generator 33. The relative phase signal 114 from the relative phase detector 32 is sent to the delay time adjuster 23. The delay time adjuster 23 comprises, for example, a random access memory which stores the compressed video signal 103, and produces a delayed video signal 104 with a proper delay. The delay time of the delay time adjuster 23 is adjusted according to the relative phase signal 114 from the relative phase detector 32.

The tracking controller 34 performs tracking control, or controls the rotating speed of the capstan motor 15, so that the magnetic head is set on a pre-recorded track by the pilot signal contained in the reproduced signal 110. The system controller 37 detects settlement of the tracking control from the tracking error signal 118, and produces a store command signal 115. The relative phase detector 32, when receiving the store command signal 115, stores, holds and produces the relative phase signal 114 at that moment. Accordingly, the delay time adjuster 23 delays the compressed video signal 103 by the delay time corresponding to the stored relative phase signal 114 to produce a delayed video signal 104. That is, the delayed video signal 104 is delayed and adjusted so as to be matched in frame phase with the reproduced video signal 110. Afterwards, the system controller 37 detects the starting point of the next frame unit from the track position signal 111, add produces a changeover signal 116 to change the switch 25 to the 26A side, and at the same time changes the control of the capstan motor controller 36 so as to control the capstan motor 15 at a specific constant rotating speed at the time of recording. As a result and the magnetic heads 13A, 13B are operated to record the modulated video signal 105 from the modulator 24.

The effect of the digital signal recording and reproducing apparatus of the present invention is explained below. When newly recording in a pre-recorded region, the system controller 37 first selects the reproducing state, controls the tracking using the pilot signal on the track by the tracking controller 34, and thereafter starts recording. Thus, the continuity of the track is maintained.

In the reproducing state, consequently, the reproduced position detector 31 detects the reproduced track position in the frame unit from the reproduced signal, and the relative position detector 32 detects, stores and maintains the relative phase signal 114 depending on the relative phase difference of the track position signal 111 from the phase of the frame reference signal 112 synchronized with the input video signal 101. The delay time adjuster 23 sets the delay time depending on the relative phase signal 114, and produces the delayed video signal 104 from the compressed video signal 103. The delay time adjuster 23 is capable of adjusting at least the delay time corresponding to six tracks. As a result, the reproducing timings of the delayed video signal 104 and the reproduced video signal 110 from the track are matched in frame period.

From the start point of the frame after delay adjustment the system controller 37 changes to the recording state, and records the modulated video signal 105 from the modulator 24. The capstan motor controller 36 at this time is changed over to control the rotation of the capstan motor 15 at a constant speed, so that the tape 11 Is driven to run at a constant speed. As a result, the continuity of the frame unit is maintained at the recording starting track.

In this way, continuity of tracks at a start point of recording and continuity of frame unit (shuffling group unit) can be realized. Therefore, when thus recorded magnetic tape is reproduced, a reproduced image of high quality free of noise is obtained even in the splicing portion of the recording.

The tracking control for controlling the tape running is sufficient enough by performing only track reproduction action by pilot signal temporarily, and it is not necessary to control the timing adjustment by matching the reproduced track by force with the frame reference signal 122 synchronized with the input video signal 101. Thus, the tracking control is extremely simplified.

Furthermore, since the video signal is delayed after having been compressed, the video information in the delay time is less, and the amount of memory in the delay time adjuster 23 can be significantly decreased.

In the embodiment, the tracking control is applied by reproducing the pilot signal coexisting on the track, but the invention is not limited to such case alone, and, for example, tracking may be applied by recording and reproducing a pilot signal partly in a specified position on the track, or tracking may be applied by using a control signal recorded in a linear track.

The shuffling group unit of compression and division is not limited to one frame alone, but may be spread over plural frames.

Only the video signal is recorded in this embodiment, but the video signal, audio signal and other information signal may be recorded together in a same track.

What is claimed is:

1. A digital signal recording and reproducing apparatus for recording a digital video signal in each specific group unit which is composed of one or more frames onto N consecutive tracks (N being an integer of 4 or more) of a recording tape, comprising:
   a compressing means for compressing data of an input digital video signal in each specific group unit to obtain a compressed video signal;
   a head for recording the compressed video signal in each specific group unit onto N consecutive tracks on the recording tape and for reproducing the recorded signal from the recording tape;
   a switching means for changing over the head for recording and reproducing;
   a tracking control means for performing a tracking control of the head of a track of the recording tape during reproducing by using pilot signals recorded on the recording tape;
   a reproduced position detecting means for detecting a reproduced track among said N consecutive tracks from a reproduced signal obtained from the head and for producing a track position signal indicative of the reproduced track;
   a relative phase detecting means for detecting a relative phase of the track position signal with respect to that of a reference signal synchronized with the input digital video signal; and
   a delay time adjusting means for delaying the compressed video signal for a delay time corresponding to one or plural tracks according to the relative phase detected by the relative phase detecting means;
   wherein the switching means is changed over from reproducing to recording after the delay time is set by the delay time adjusting means corresponding to the relative phase detected by the relative phase detecting means, thereby recording the compressed video signal delayed by the delay time adjusting means.

2. An apparatus of claim 1, wherein the number of consecutive tracks each of which having a different pilot signal from another is an integer of at least 2 and smaller than N.

3. An apparatus of claim 1, wherein pilot signals of a first frequency and a second frequency are alternately recorded on every two tracks, and the tracking control means performs the tracking control by using the pilot signals having the first and second frequencies.

4. An apparatus of claim 1, wherein the tracking control means performs the tracking control by controlling a rotating speed of a capstan motor for driving the recording medium according to an error signal obtained from pilot signals recorded on the tracks.

5. An apparatus of claim 1, wherein the switching means changes over at intervals of said specific group unit of a compressed video signal.

6. A digital signal recording and reproducing apparatus for recording a digital video signal in each frame onto N consecutive tracks (N being an integer of 4 or more) of a recording tape, comprising:
   a compressing means for compressing data of an input digital video signal in each specific group unit to obtain a compressed video signal;
   a head for recording the compressed video signal in each specific group unit onto N consecutive tracks on the recording tape and for reproducing the recorded signal from the recording tape;
   a switching means for changing over the head for recording and reproducing;
   a tracking control means for performing a tracking control of the head on a track of the recording tape during reproducing by using pilot signals recorded on the recording tape;
   a reproduced position detecting means for detecting a reproduced track among said N consecutive tracks from a reproduced signal obtained from the head and for producing a track position signal indicative of the reproduced track;
   a relative phase detecting means for detecting a relative phase of the track position signal with respect to that of a reference signal synchronized with the input digital video signal; and
   a delay time adjusting means for delaying the compressed video signal for a delay time corresponding to one or plural tracks according to the relative phase detected by the relative phase detecting means;
   wherein the switching means is changed over from reproducing to recording after the delay time is set by the delay time adjusting means corresponding to the relative phase detected by the relative phase detecting means, thereby recording the compressed video signal delayed by the delay time adjusting means.

7. An apparatus of claim 6, wherein the number of consecutive tracks each of which having a different pilot signal from another is an integer of at least 2 and smaller than N.

8. An apparatus of claim 6, wherein pilot signals of a first frequency and a second frequency are alternately recorded on every two tracks, and the tracking control means performs the tracking control by using the pilot signals having the first and second frequencies.

9. An apparatus of claim 6, wherein the tracking control means performs the tracking control by controlling a rotating speed of a capstan motor for driving the recording medium according to an error signal obtained from the pilot signals recorded on the tracks.

10. An apparatus of claim 6, wherein the switching means changes over at intervals of the frame of the compressed video signal.

* * * * *